United States Patent
Chen et al.

(10) Patent No.: US 8,638,819 B2
(45) Date of Patent: Jan. 28, 2014

(54) WIRELESS COMMUNICATION TRANSCEIVER AND MODE-SWITCH DEVICE THEREOF

(75) Inventors: Jian Wen Chen, Beijing (CN); Lin Chen, Beijing (CN); Yong Hua Lin, Beijing (CN); Qing Wang, Beijing (CN); Rong Yan, Beijing (CN); Zhen Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/892,964

(22) Filed: Sep. 29, 2010

(65) Prior Publication Data

US 2011/0075593 A1 Mar. 31, 2011

(30) Foreign Application Priority Data

Sep. 29, 2009 (CN) .......................... 2009 1 0178547

(51) Int. Cl.
*H04J 4/00* (2006.01)
(52) U.S. Cl.
USPC ........................... 370/478; 370/280; 370/302
(58) Field of Classification Search
USPC ......... 370/275–282, 293–295, 299, 302, 442, 370/478
See application file for complete search history.

(56) References Cited

U.S. PATENT DOCUMENTS

| | | | | |
|---|---|---|---|---|
| 5,475,677 A * | 12/1995 | Arnold et al. | ................. | 370/280 |
| 5,519,691 A * | 5/1996 | Darcie et al. | ................. | 370/331 |
| 5,590,173 A * | 12/1996 | Beasley | ................. | 370/307 |
| 5,657,344 A * | 8/1997 | Na | ................. | 375/219 |
| 5,812,522 A * | 9/1998 | Lee et al. | ................. | 370/206 |
| 5,926,466 A * | 7/1999 | Ishida et al. | ................. | 370/280 |
| 6,130,897 A | 10/2000 | Ishida et al. | | |
| 6,389,059 B1 * | 5/2002 | Smith et al. | ................. | 375/141 |
| 6,611,507 B1 * | 8/2003 | Hottinen et al. | ................. | 370/331 |
| 7,248,567 B2 * | 7/2007 | Desgagne et al. | ................. | 370/277 |
| 7,502,596 B2 * | 3/2009 | Takao et al. | ................. | 455/78 |
| 7,706,308 B2 * | 4/2010 | Yun et al. | ................. | 370/280 |
| 7,773,635 B2 * | 8/2010 | Eichinger et al. | ................. | 370/478 |
| 7,817,671 B2 * | 10/2010 | Isaksson | ................. | 370/480 |
| 2005/0100082 A1 * | 5/2005 | Ma | ................. | 375/148 |
| 2007/0025291 A1 * | 2/2007 | Afrashteh et al. | ................. | 370/330 |
| 2008/0232305 A1 * | 9/2008 | Oren et al. | ................. | 370/328 |
| 2008/0299963 A1 * | 12/2008 | Balachandran et al. | ... | 455/422.1 |
| 2009/0185511 A1 * | 7/2009 | Lee et al. | ................. | 370/280 |
| 2009/0207760 A1 * | 8/2009 | Brunel et al. | ................. | 370/280 |

* cited by examiner

*Primary Examiner* — Kevin Mew
(74) *Attorney, Agent, or Firm* — Tutunjian & Bitetto, P.C.; Jennifer R. Davis

(57) ABSTRACT

A wireless communication transceiver and a mode switch device thereof. The transceiver includes: a first band transmission path; a first band reception path; a second band transmission path; a second band reception path; a path switch and a control unit. In a dual band time division duplexing mode, the control unit controls the path switch so that the path switch connects a received radio frequency signal from an antenna to the first band reception path, and connects a transmitted radio frequency signal from the second band transmission path to the antenna in an odd cycle or an even cycle; and controls the path switch so that the path switch connects a received radio frequency signal from the antenna to the second band reception path, and connects a transmitted radio frequency signal from the first band transmission path to the antenna in another odd cycle or another even cycle.

13 Claims, 12 Drawing Sheets

WIRELESS COMMUNICATION TRANSCEIVER AND MODE-SWITCH DEVICE THEREOF

CROSS-REFERENCE TO RELATED APPLICATIONS

This application claims priority under 35 U.S.C. §119 to Chinese Patent Application No. 200910178547.X filed Sep. 29, 2009, the entire contents of which are incorporated by reference herein.

BACKGROUND OF THE INVENTION

1. Field of the Invention

The present invention relates to a wireless communication transceiver and a mode switch device thereof, especially to a wireless communication transceiver supporting a time division duplexing mode and/or a frequency division duplexing mode, and a mode switch device thereof.

2. Description of the Related Art

Recently, various types of mobile communication systems have been proposed as demands for mobile communication services increase. A mobile communication system has been proposed that supports the time division duplexing mode, where a base station and a mobile terminal transmit and receive signals on the same band in a time-division manner. A mobile communication system has also been proposed that supports the frequency division duplexing mode, where a base station transmits signals to a mobile terminal on one band and receives signals from the mobile terminal on another different band. To increase flexibility in the configuration of mobile communication systems, a mobile communication system has also been proposed that can switch between the time division duplexing mode and the frequency division duplexing mode as required. For example, a wireless communication transceiver adopted by such mobile communication systems and a mode switch device for switching between operating modes have been described in U.S. Pat. No. 6,130,897, "Time Division Multiple Access FDD, TDD Dual Mode Radio And A Time Division Multiple Access TDD Dual Band System", issued on Oct. 10, 2000.

Because the mobile communication system supporting the time division duplexing mode and the frequency division duplexing mode has been proposed, operators for such a mobile communication system usually apply for two different bands for their mobile communication systems, so as to be able to meet the requirement of the frequency division duplexing mode. However, when the mobile communication system is operating in the time division duplexing mode, only one band is used, while another band is idle, causing wasting of frequency spectrum resources.

SUMMARY OF THE INVENTION

According to one aspect of the present invention, a wireless communication transceiver includes: a first band transmission path for modulating data to be sent into a radio frequency signal of the first band; a first band reception path for demodulating a received radio frequency signal of the first band into received data; a second band transmission path for modulating data to be sent into a radio frequency signal of a second band different from the first band; a second band reception path for demodulating a received radio frequency signal of the second band into received data; a path switch and a control unit, where in a dual band time division duplexing mode, the control unit (i) controls the path switch so that the path switch connects a received radio frequency signal from an antenna to the first band reception path, and connects a transmitted radio frequency signal from the second band transmission path to the antenna in an odd cycle or an even cycle; and (ii) controls the path switch so that the path switch connects a received radio frequency signal from the antenna to the second band reception path, and connects a transmitted radio frequency signal from the first band transmission path to the antenna in another odd cycle or in another even cycle.

According to another aspect of the present invention, a mode switch device for a wireless communication transceiver includes: a path switch which, in response to a control signal indicating that the wireless communication transceiver is operating in a dual band time division duplexing mode and indicative of an odd cycle or an even cycle, connects a received radio frequency signal from an antenna to a first band reception path for demodulating the received radio frequency signal of a first band into received data, and connects a transmitted radio frequency signal from a second band transmission path, for modulating data to be sent into the radio frequency signal of a second band different from the first band, to the antenna, and in response to a control signal indicating that the wireless communication transceiver is operating in the dual band time division duplexing mode and indicative of another odd cycle or another even cycle, connects a received radio frequency signal from the antenna to a second band reception path for demodulating the received radio frequency signal of the second band into received data, and connects a transmitted radio frequency signal from a first band transmission path, for modulating data to be sent into the radio frequency signal of the first band, to the antenna.

BRIEF DESCRIPTION OF THE DRAWINGS

The above and/or other aspects, features and/or advantages of the present invention will be easily appreciated in view of the following description by referring to the accompanying figures. In the accompanying drawings, identical or corresponding technical features or components will be represented with identical or corresponding reference numbers.

The present invention provides a wireless communication transceiver and a mode switch device thereof, such that two different bands can be utilized at the same time when the wireless communication transceiver is operating in the time division duplexing mode.

DETAILED DESCRIPTION OF THE PREFERRED EMBODIMENTS

Figure 1:
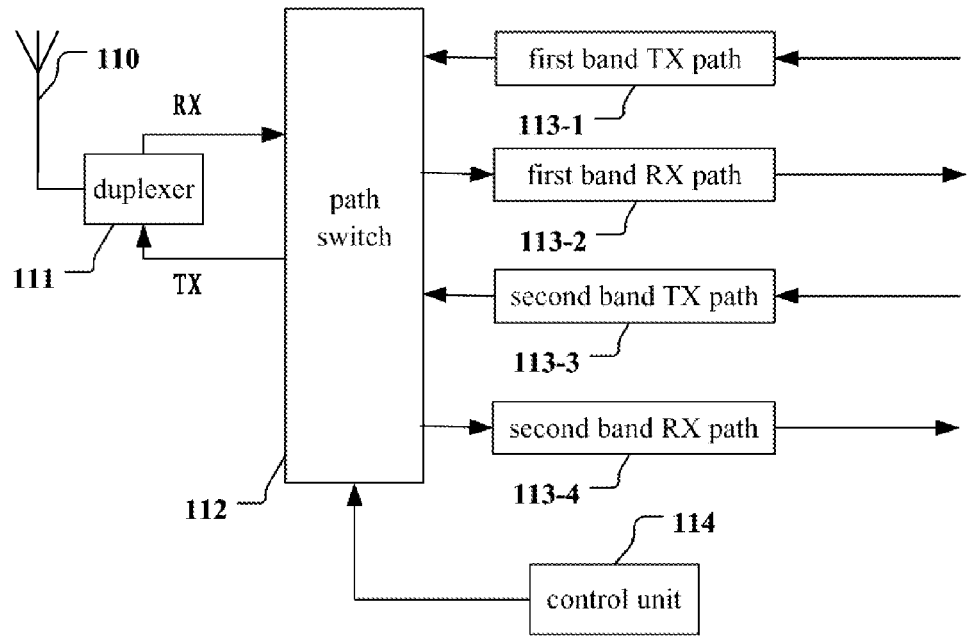
FIG. 1 is a block diagram showing an exemplary structure of the wireless communication transceiver according to an embodiment of the present invention.

The embodiments of the present invention are below described by referring to the drawings. It is to be noted that, for purpose of clarity, representations and descriptions about those components and processes known by those skilled in the art but unrelated to the present invention are omitted in the drawings and the description.

Referring to FIG. 1, a block diagram shows an exemplary structure of the wireless communication transceiver according to an embodiment of the present invention. As shown in FIG. 1, the wireless communication transceiver includes an antenna 110, a duplexer 111, a first band transmission path 113-1, a first band reception path 113-2, a second band transmission path 113-3, a second band reception path 113-4, a path switch 112 and a control unit 114.

The antenna 110 is used for receiving and transmitting radio frequency signals. The duplexer 111 is used for isolating the radio frequency signals transmitted and received through the antenna, to avoid the transmitted radio frequency signals from entering into the reception path. It should be noted that the duplexer 111 is not necessary. For example, in case when it is not required to transmit and receive at the same time, and in the case when the transmitted radio frequency signals entering into the reception path has no influence reaching to a predetermined extent, the duplexer 111 can be omitted. Alternatively, it is possible to provide a power amplifier for power compensation to the signals between the duplexer 111 and the path switch 112.

The first band transmission path 113-1 is used for modulating data to be sent into a radio frequency signal of the first band. The first band reception path 113-2 is used for demodulating a received radio frequency signal of a first band into received data. The second band transmission path 113-3 is used for modulating data to be sent into a radio frequency signal of the second band different from the first band. The second band reception path 113-4 is used for demodulating a received radio frequency signal of the second band into received data.

In a wireless communication apparatus of a base station, for example, but not limited thereto, a communication processor is usually responsible for communication protocol processing, data transmitting and receiving, and communication control. In transmitting the data, the data from the communication processor is modulated into a baseband signal by a baseband modulation unit. The baseband signal is then converted into an intermediate frequency signal by an intermediate-frequency processing unit. An up converter then converts the intermediate frequency signal into a radio frequency signal of a predetermined band based on a frequency signal from an oscillating unit, and the radio frequency signal is filtered through a band-pass filter. The filtered radio frequency signal is transferred through a duplexer and is transmitted by the antenna. In the embodiment of the present invention, the portion between the duplexer and the intermediate-frequency processing unit in the transmission direction on a band is called as a transmission path of the band.

In addition, in receiving the data, a radio frequency signal is received through the antenna. The received radio frequency signal is transmitted to a band-pass filter through a duplexer. Then a down converter converts the radio frequency signal of the predetermined band passing through the band-pass filter into an intermediate frequency signal based on a frequency signal from an oscillating unit. The intermediate frequency signal is then converted into a baseband signal by an intermediate-frequency processing unit. A baseband demodulation unit then demodulates the baseband signal into received data. Then the received data is provided to the communication processor for processing. In the embodiment of the present invention, the portion between the duplexer and the intermediate-frequency processing unit in the reception direction on a band is called as a reception path of the band. Alternatively, it is possible to provide a power amplifier for power compensation to the signals between the duplexer 111 and the path switch 112.

The transmission path and the reception path can be provided statically, or can be dynamically formed partly or completely by common components. For example, it is possible to use the transmission path and the reception path described in U.S. Pat. No. 6,130,897, "Time Division Multiple Access FDD, TDD Dual Mode Radio And A Time Division Multiple Access TDD Dual Band System", issued on Oct. 10, 2000.

The path switch 112 acts as a mode switch device, which establishes connection relations between the received radio frequency signal RX from the duplexer 111 and the transmitted radio frequency signal TX to be inputted into the duplexer 111, and the first band transmission path 113-1, first band reception path 113-2, second band transmission path 113-3 and second band reception path 113-4.

Figure 2:
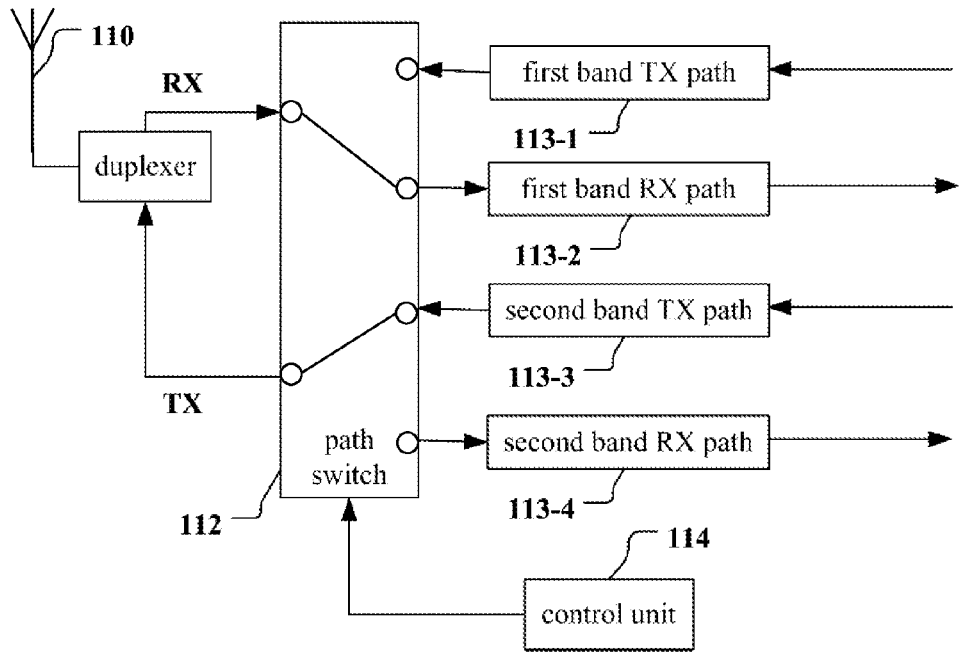
FIG. 2 is a block diagram showing a kind of connection relation when the wireless communication transceiver of FIG. 1 is operating in the dual band time division duplexing mode according to an embodiment of the present invention.

Referring to FIG. 2, a block diagram shows a kind of connection relation when the wireless communication transceiver of FIG. 1 is operating in the dual band time division duplexing mode (i.e., a mode where the signal reception and the signal transmission are performed in a time-division manner on two different bands). As shown in FIG. 2, in the dual band time division duplexing mode, the control unit 114 controls the path switch 112, so that the path switch 112 connects the received radio frequency signal RX from the duplexer 111 to the first band reception path 113-2, and connects the transmitted radio frequency signal TX from the second band transmission path 113-3 to the antenna in an odd cycle or an even cycle (for example, odd cycle/even cycle). In the connection state as shown in FIG. 2, the radio frequency signal of the first band is received through the first band reception path 113-2, and the radio frequency signal of the second band is transmitted through the second band transmission path 113-3.

Figure 3:
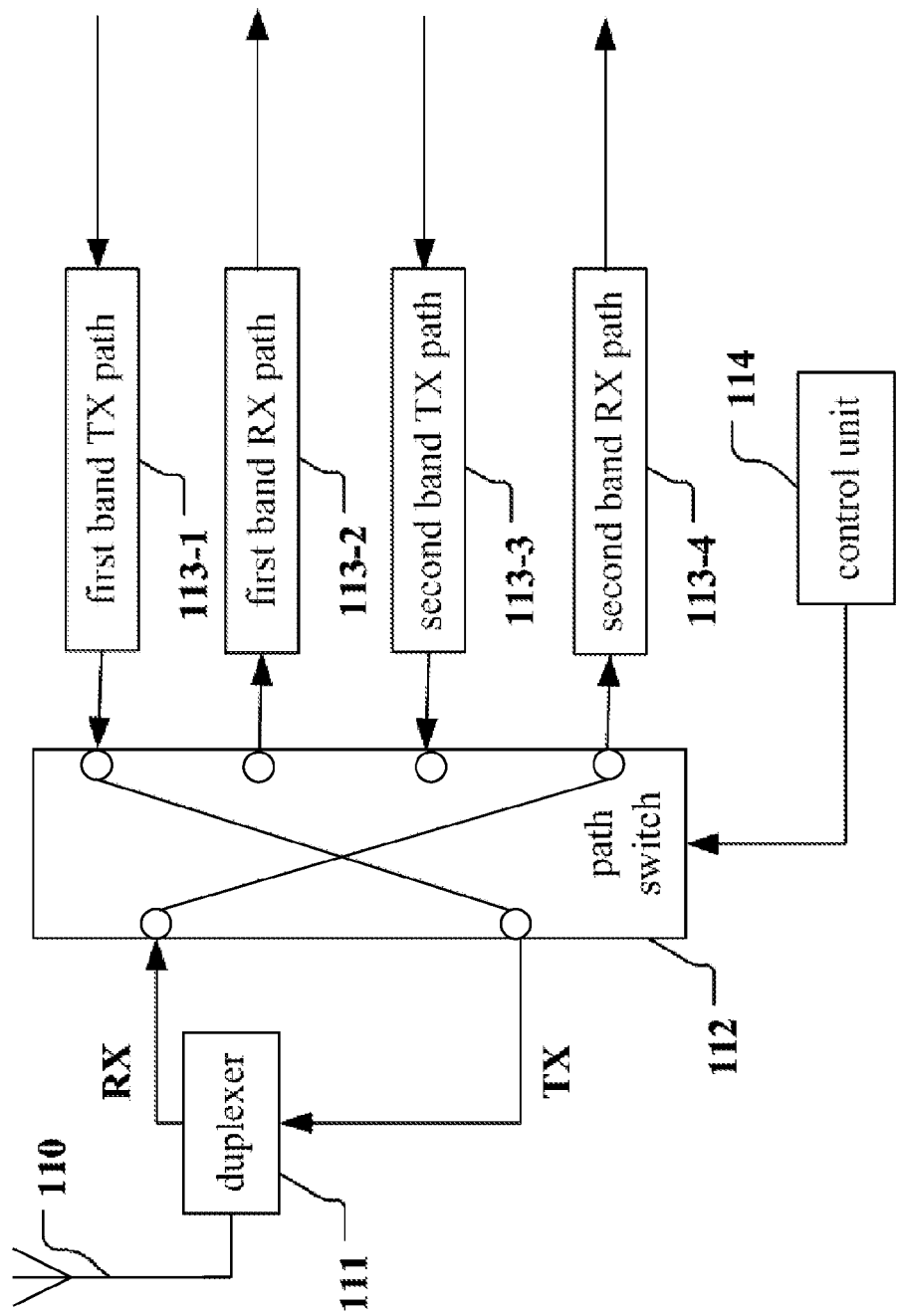
FIG. 3 is a block diagram showing another kind of connection relation when the wireless communication transceiver of FIG. 1 is operating in the dual band time division duplexing mode according to an embodiment of the present invention.

Referring to FIG. 3, a block diagram shows another kind of connection relation when the wireless communication transceiver of FIG. 1 is operating in the dual band time division duplexing mode. As shown in FIG. 3, the control unit 114 controls the path switch 112, so that the path switch 112 connects the received radio frequency signal RX from the duplexer 111 to the second band reception path 113-4, and connects the transmitted radio frequency signal TX from the first band transmission path 113-1 to the duplexer 111 in another odd cycle or another even cycle (for example, even cycle/odd cycle). In the connection state as shown in FIG. 3, the radio frequency signal of the second band is received through the second band reception path 113-4, and the radio frequency signal of the first band is transmitted through the first band transmission path 113-1.

Therefore, the control unit 114 repeats the above control in response to the odd cycle and the even cycle in the dual band time division duplexing mode. The odd cycle and the even cycle refer to the transmission and reception cycles in the time division duplexing mode. References to the odd cycle and the even cycle are intended to distinguish two successive cycles presenting continuously, and are not limited to the correspondence in which the odd cycle is the transmission cycle and the even cycle is the reception cycle. There can also be a correspondence in which the even cycle is the transmission cycle and the odd cycle is the reception cycle.

In the case that the wireless communication transceiver is operating in the dual band time division duplexing mode, the control unit 114 may identify the odd cycle and the even cycle, and transmit a control signal corresponding to the respective cycle to the path switch 112. The path switch 112 then establishes a corresponding connection relation according to the control signal.

In the embodiments of the present invention described herein and hereafter, the path switch 112 can be implemented with a switch chip in the form of an integrated circuit, a matrix switch, or a switch logic implemented with a programmable logic circuit. By taking the matrix switch as an example, in operation, the matrix switch implements a corresponding switch logic under control by the control signal from the control unit 114. It is also possible to implement the switch logic of the path switch with other known switch techniques.

Figure 4:
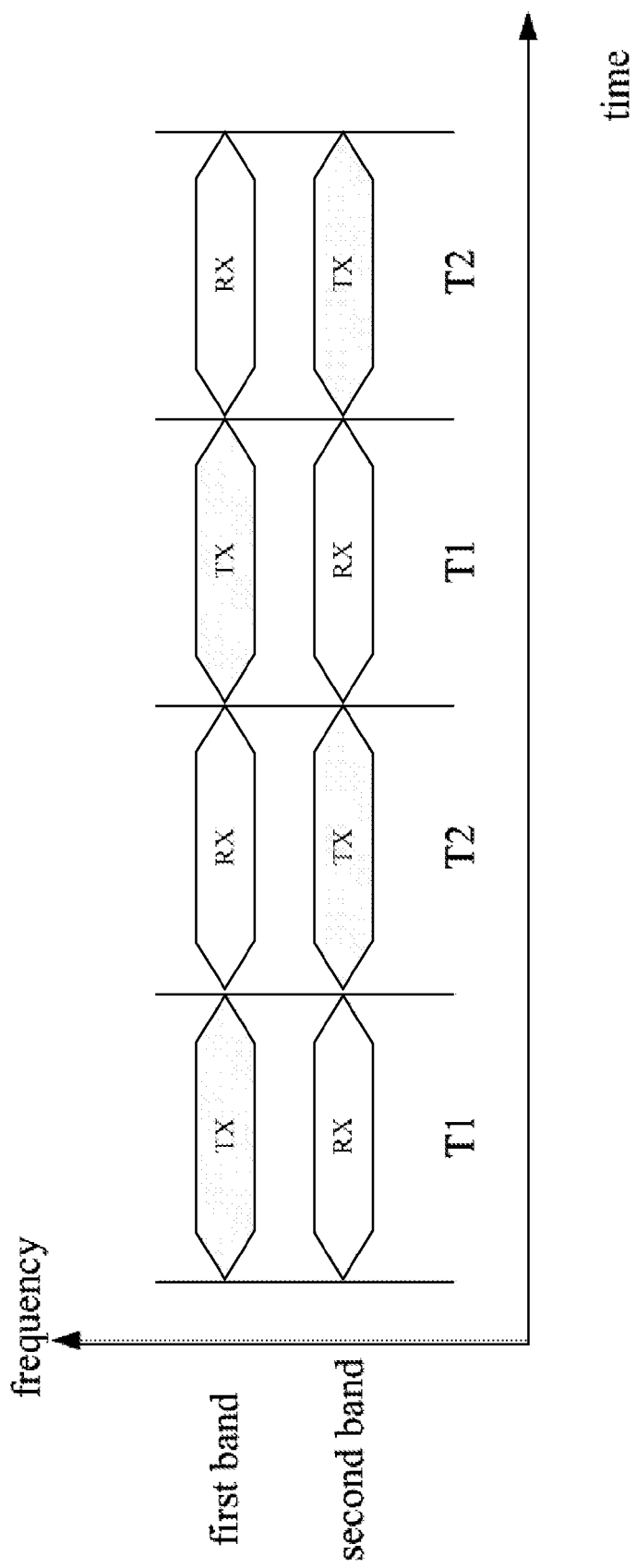
FIG. 4 is a timing chart schematically showing a portion of timings in which the wireless communication transceiver of FIG. 1 transmits and receives on two bands according to an embodiment of the present invention.

Referring to FIG. 4, a timing chart schematically shows a portion of timings in which the wireless communication transceiver of FIG. 1 transmits and receives on two bands. In FIG. 4, T1 represents the odd cycles, and T2 represents the even cycles. As shown in FIG. 4, under control by the control unit 114, the wireless communication transceiver transmits in the odd cycles and receives in the even cycles, on the first band, and receives in the odd cycles and transmits in the even cycles, on the second band.

It is possible to indicate to the control unit 114 when the wireless communication transceiver enters into the dual band time division duplexing mode in various ways. For example, it is possible to input a signal indicating the entrance into the dual band time division duplexing mode to the control unit 114 through a dedicated connection or a network connection, to input the signal indicating the entrance into the dual band time division duplexing mode by providing an input device on the control unit 114, to enable the entrance into the dual band time division duplexing mode by the control unit 114 according to predetermined configuration information, or the like.

The control unit 114 can be implemented through various ways. In an exemplary implementation, the control unit 114 can be a logic circuit, for example, a logic circuit composed of analog device and digital logic devices, or a logic circuit obtained by programming a programmable logic device. Such a logic circuit can provide control signals corresponding to the odd cycle and the even cycle to the path switch 112 in response to the signal indicating the entrance into the dual band time division duplexing mode, to implement the connection state as shown in FIG. 2 and FIG. 3. In another exemplary implementation, the control unit 114 can be a processor such as a central processing unit (CPU), a microprocessor, an on-chip processing core and the like, which executes a predetermined processing process according to a program loaded in a memory or firmware, thereby providing control signals corresponding to the odd cycle and the even cycle to the path switch 112 in response to the signal indicating the entrance into the dual band time division duplexing mode, to implement the connection state as shown in FIG. 2 and FIG. 3.

In an exemplary application, a base station including the wireless communication transceiver as shown in FIG. 1 can serve two mobile communication systems, where the first mobile communication system operates on a first band in the time division duplexing manner, while the second mobile communication system operates on a second band in the time division duplexing manner. According to the control by the control unit 114 in the dual band time division duplexing mode, for example, the first mobile communication system transmits on the first band, and the second mobile communication system receives on the second band, in the present cycle. The first mobile communication system receives on the first band, and the second mobile communication system transmits on the second band, in the next cycle. By repeating so, two mobile communication systems operate on the first band and the second band respectively in the time division duplexing manner. In this case, because two mobile communication systems operate at the same time, necessary communication processing resources are provide in the base station accordingly.

In another exemplary application, a base station including the wireless communication transceiver as shown in FIG. 1 can serve one mobile communication system, where data transmitted between the base station and a mobile terminal is divided into two portions according to a predetermined rule. The mobile communication system operates on the first band in the time division duplexing manner to transmit the first portion of data, and operates on the second band in the time division duplexing manner to transmit the second portion of data. According to the control by the control unit 114 in the dual band time division duplexing mode, for example, the mobile communication system transmits on the first band, and receives on the second band, in the present cycle. The mobile communication system receives on the first band, and transmits on the second band, in the next cycle. By repeating so, the mobile communication system operates on the first band and the second band respectively in the time division duplexing manner. In this case, a mobile terminal can use the wireless communication transceiver of the embodiment according to the present invention, and at the receiving end, two portions of data may be combined according to the predetermined rule to obtain the transmitted data.

Figure 5:
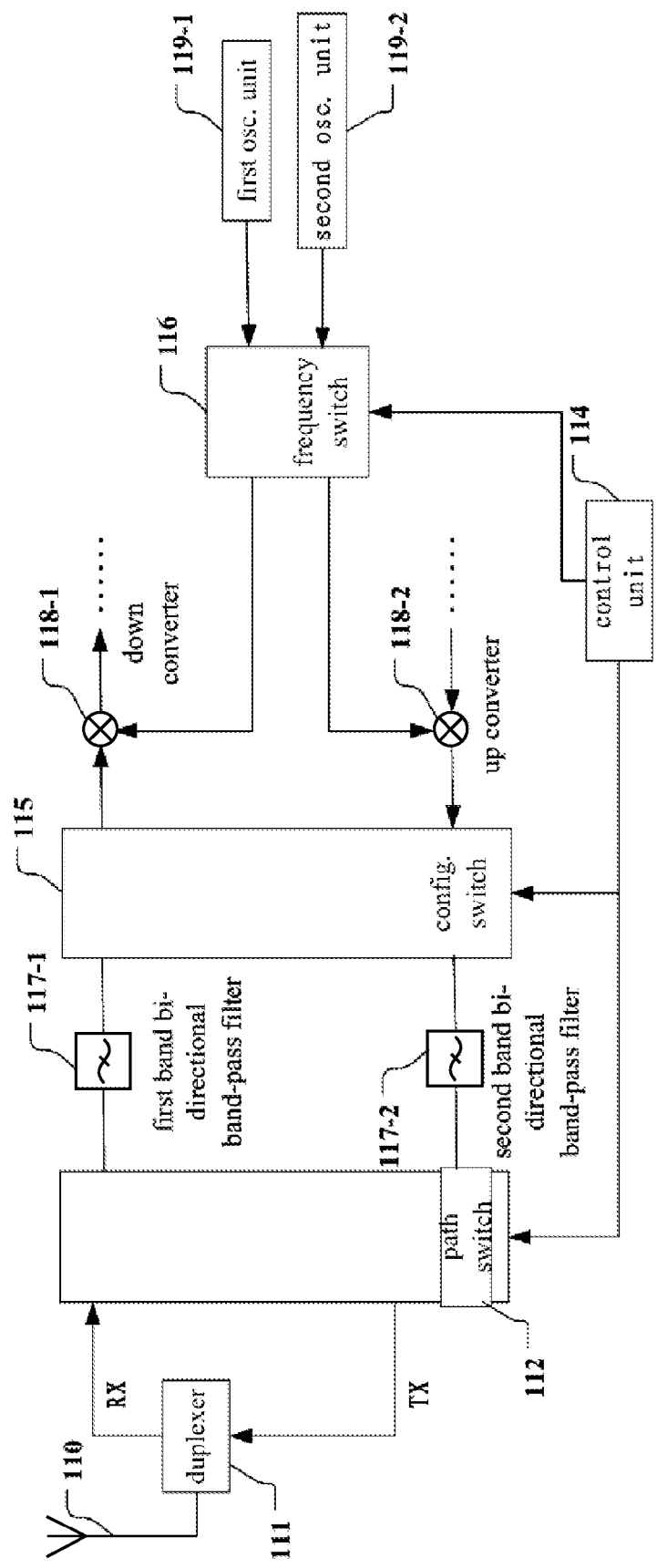
FIG. 5 is a block diagram showing an exemplary structure of the wireless communication transceiver according to an embodiment of the present invention.

FIG. 5 is a block diagram showing an exemplary structure of the wireless communication transceiver according to a preferable embodiment of the present invention. As shown in FIG. 5, the wireless communication transceiver includes an antenna 110, a duplexer 111, a path switch 112, a control unit 114, a first band bi-directional band-pass filter 117-1, a second band bi-directional band-pass filter 117-2, a configuration switch 115, a down converter 118-1, an up converter 118-2, a frequency switch 116, a first oscillating unit 119-1 and a second oscillating unit 119-2. The antenna 110, duplexer 111, path switch 112 as shown in FIG. 5 are identical to the antenna 110, duplexer 111, path switch 112 as shown in FIG. 1 respectively, and description thereof is omitted. Furthermore, the control by the control unit 114 to the path switch 112 is identical to that as shown in FIG. 1, and description thereof is omitted.

The first band bi-directional band-pass filter 117-1 can pass through radio frequency signals of a first band in two directions. The second band bi-directional band-pass filter 117-2 can pass through radio frequency signals of a second band in two directions.

The down converter 118-1 is used for converting a radio frequency signal into an intermediate frequency signal. The up converter 118-2 is used for converting an intermediate frequency signal into a frequency signal.

The first oscillating unit 119-1 is used for generating an oscillating signal of a first frequency. The second oscillating unit 119-2 is used for generating an oscillating signal of a second frequency.

The configuration switch 115, the path switch 112 and the frequency switch 116 serve as a mode switch device. Under control by the control unit 114, the configuration switch 115 connects the first band bi-directional band-pass filter 117-1 with the down converter 118-1 or the up converter 118-2 to form a first band reception path or a first band transmission path, and connects the second band bi-directional band-pass filter 117-2 with the down converter 118-1 or the up converter 118-2 to form a second band reception path or a second band transmission path.

In the case when the wireless communication transceiver is operating in the dual band time division duplexing mode, the control unit 114 can identify the odd cycle and the even cycle, and transmit a control signal corresponding to the respective cycle to the configuration switch 115. The configuration switch 115 then establishes a corresponding connection relation according to the control signal.

In the embodiments of the present invention described herein and hereafter, the configuration switch 115 can be implemented with a switch chip in the form of an integrated circuit, a matrix switch, or a switch logic implemented with a programmable logic circuit. By taking the matrix switch as an example, in operation, the matrix switch implements a corresponding switch logic under control by the control signal from the control unit 114. It is also possible to implement the switch logic of the configuration switch with other known switch techniques.

While under the control of the control unit 114, the frequency switch 116 provides the down converter 118-1 and the up converter 118-2 with a frequency signal from the first oscillating unit to convert the radio frequency signal of the first band into the intermediate frequency signal, or to convert the intermediate frequency signal into the radio frequency signal of the first band when the down converter 118-1 and the up converter 118-2 are used for the radio frequency signal of the first band; provides the down converter 118-1 and the up converter 118-2 with a frequency signal from the second oscillating unit to convert the radio frequency signal of the second band into the intermediate frequency signal, or to convert the intermediate frequency signal into the radio frequency signal of the second band when the down converter 118-1 and the up converter 118-2 are used for the radio frequency signal of the second band.

In the case when the wireless communication transceiver is operating in the dual band time division duplexing mode, the control unit 114 can identify the odd cycle and the even cycle, and transmit a control signal corresponding to the respective cycle to the frequency switch 116. The frequency switch 116 then establishes a corresponding connection relation according to the control signal.

In the embodiments of the present invention described herein and hereafter, the frequency switch 116 can be implemented with a switch chip in the form of an integrated circuit, a matrix switch, or a switch logic implemented with a programmable logic circuit. By taking the matrix switch as an example, in operation, the matrix switch implements a corresponding switch logic under control of the control signal from the control unit 114. It is also possible to implement the switch logic of the frequency switch with other known switch techniques.

In the dual band time division duplexing mode, the control unit 114 controls the configuration switch 115 and the frequency switch 116, in addition to the path switch 112 described in connection with the embodiment of FIG. 1.

In the embodiment of FIG. 5, it is possible to indicate to the control unit 114 that the wireless communication transceiver enters into the dual band time division duplexing mode through various ways. For example, it is possible to input a signal indicating the entrance into the dual band time division duplexing mode to the control unit 114 through a dedicated connection or a network connection, to input the signal indicating the entrance into the dual band time division duplexing mode by providing an input device on the control unit 114, to enable the entrance into the dual band time division duplexing mode by the control unit 114 according to predetermined configuration information, or the like.

Figure 6:
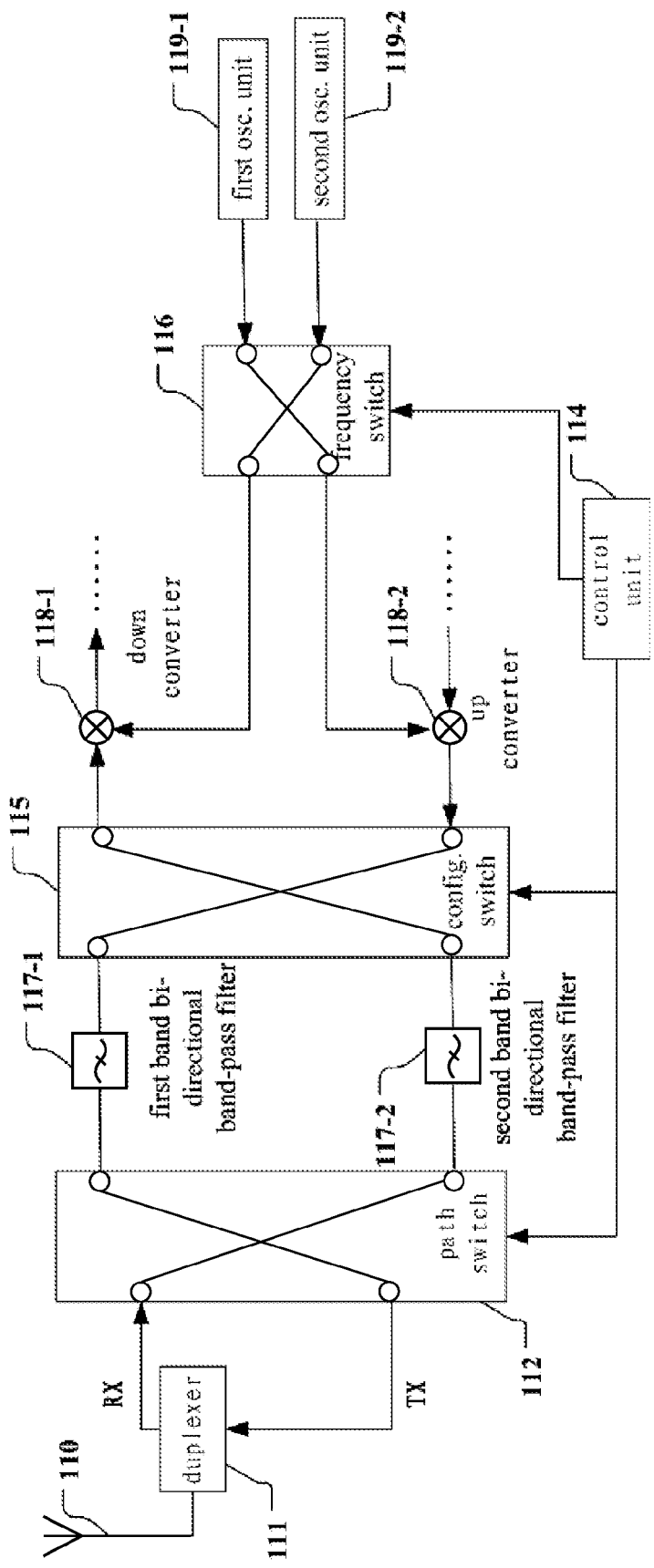
FIG. 6 is a block diagram showing a kind of connection relation when the wireless communication transceiver of FIG. 5 is operating in the dual band time division duplexing mode according to an embodiment of the present invention.

FIG. 6 is a block diagram showing a kind of connection relation when the wireless communication transceiver of FIG. 5 is operating in the dual band time division duplexing mode. As shown in FIG. 6, in the dual band time division duplexing mode, the control unit 114 controls the configuration switch 115 and the frequency switch 116, so that the configuration switch 115 connects the first band bi-directional band-pass filter 117-1 with the down converter 118-1, and the frequency switch 116 connects the down converter 118-1 with the first oscillating unit 119-1, thereby forming the first band reception path, while the configuration switch 115 connects the second band bi-directional band-pass filter 117-2 with the up converter 118-2, and the frequency switch 116 connects the up converter 118-2 with the second oscillating unit 119-2, thereby forming the second band transmission path, in one of the odd cycle and the even cycle (for example, odd cycle/even cycle).

Figure 7:
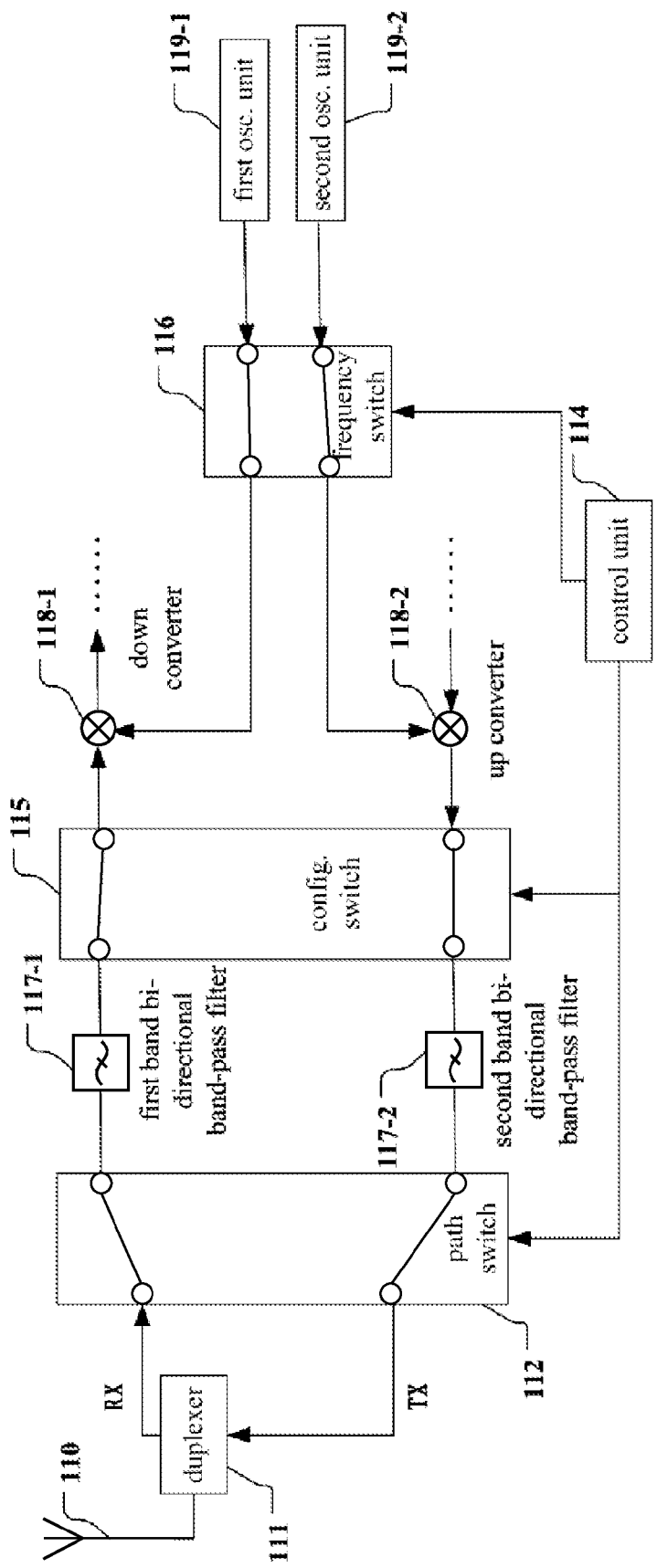
FIG. 7 is a block diagram showing another kind of connection relation when the wireless communication transceiver of FIG. 5 is operating in the dual band time division duplexing mode according to an embodiment of the present invention.

FIG. 7 is a block diagram showing another kind of connection relation when the wireless communication transceiver of FIG. 5 is operating in the dual band time division duplexing mode. As shown in FIG. 7, the control unit 114 controls the configuration switch 115 and the frequency switch 116, so that the configuration switch 115 connects the second band bi-directional band-pass filter 117-2 with the down converter 118-1, and the frequency switch 116 connects the down converter 118-1 with the second oscillating unit 119-2, thereby forming the second band reception path, while the configuration switch 115 connects the first band bi-directional band-pass filter 117-1 with the up converter 118-2, and the frequency switch 116 connects the up converter 118-2 with the first oscillating unit 119-1, thereby forming the first band transmission path, in another of the odd cycle and the even cycle (for example, even cycle/odd cycle).

In the embodiment shown in FIG. 5, the first band transmission path, the first band reception path, the second band transmission path and the second band reception path are formed dynamically. While under the control of the control unit 114, the path switch 112 establishes connections from the first band transmission path, the first band reception path, the second band transmission path and the second band reception path formed dynamically to the duplexer 111.

In addition to the dual band time division duplexing mode as described in the above, the wireless communication transceivers as shown in FIG. 1 and FIG. 5 can also operate in the single band time division duplexing mode (i.e., a mode where the signal reception and the signal transmission are performed in a time-division manner on only one band).

Figure 8:
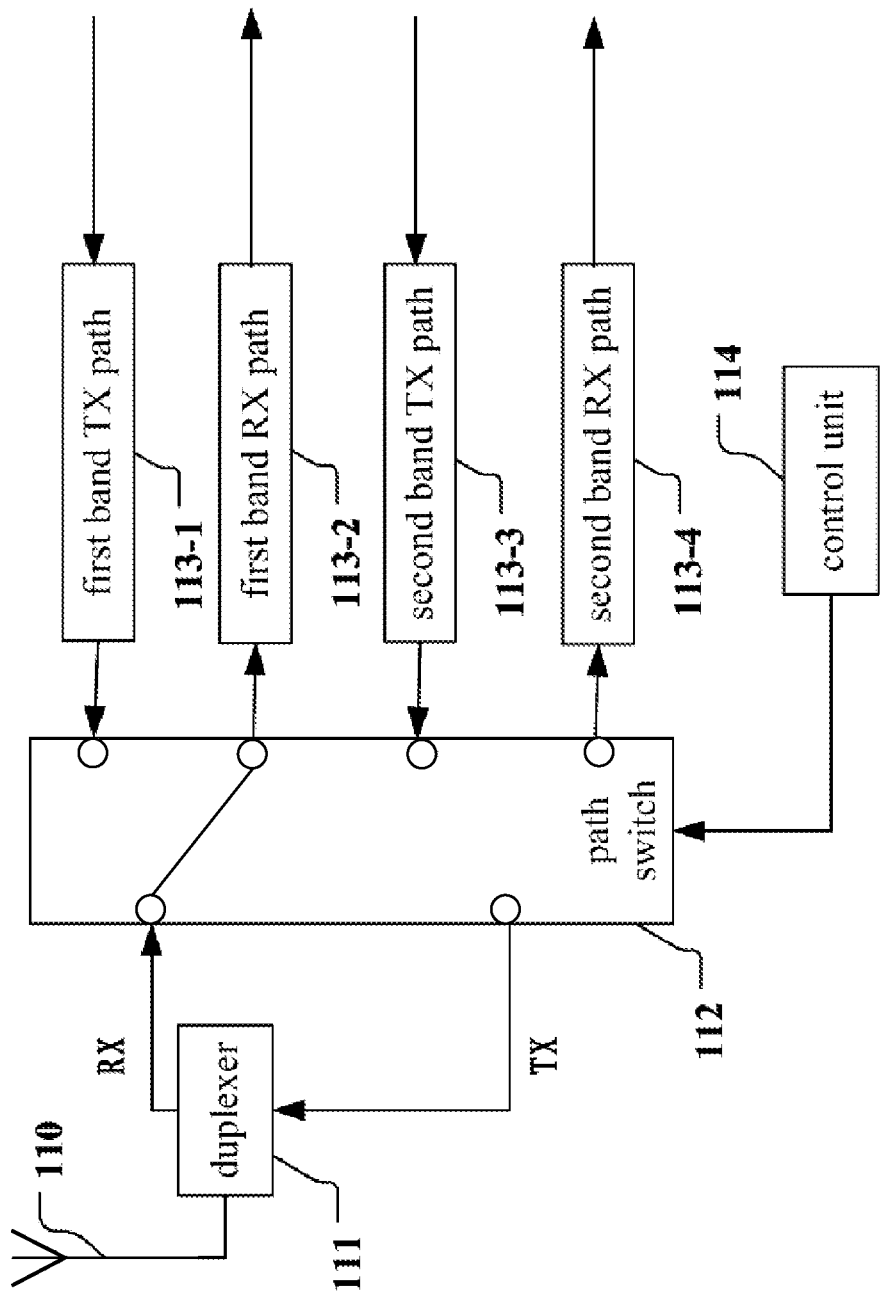
FIG. 8 is a block diagram showing a kind of connection relation when the wireless communication transceiver of FIG. 1 is operating in a single band time division duplexing mode according to an embodiment of the present invention.

FIG. 8 is a block diagram showing a kind of connection relation when the wireless communication transceiver of FIG. 1 is operating in a single band time division duplexing mode. The antenna 110, duplexer 111, first band transmission path 113-1, first band reception path 113-2, second band transmission path 113-3, second band reception path 113-4 as shown in FIG. 8 are identical to the antenna 110, duplexer 111, first band transmission path 113-1, first band reception path 113-2, second band transmission path 113-3, second band reception path 113-4 as shown in FIG. 1 respectively, and description thereof is omitted.

As shown in FIG. 8, when the wireless communication transceiver operates in the single band time division duplexing mode, the control unit 114 controls the path switch 112, so that the path switch 112 connects the received radio frequency signal RX from the duplexer 111 to the reception path operating on the first band, i.e., the first band reception path 113-2, in the reception cycle.

Figure 9:
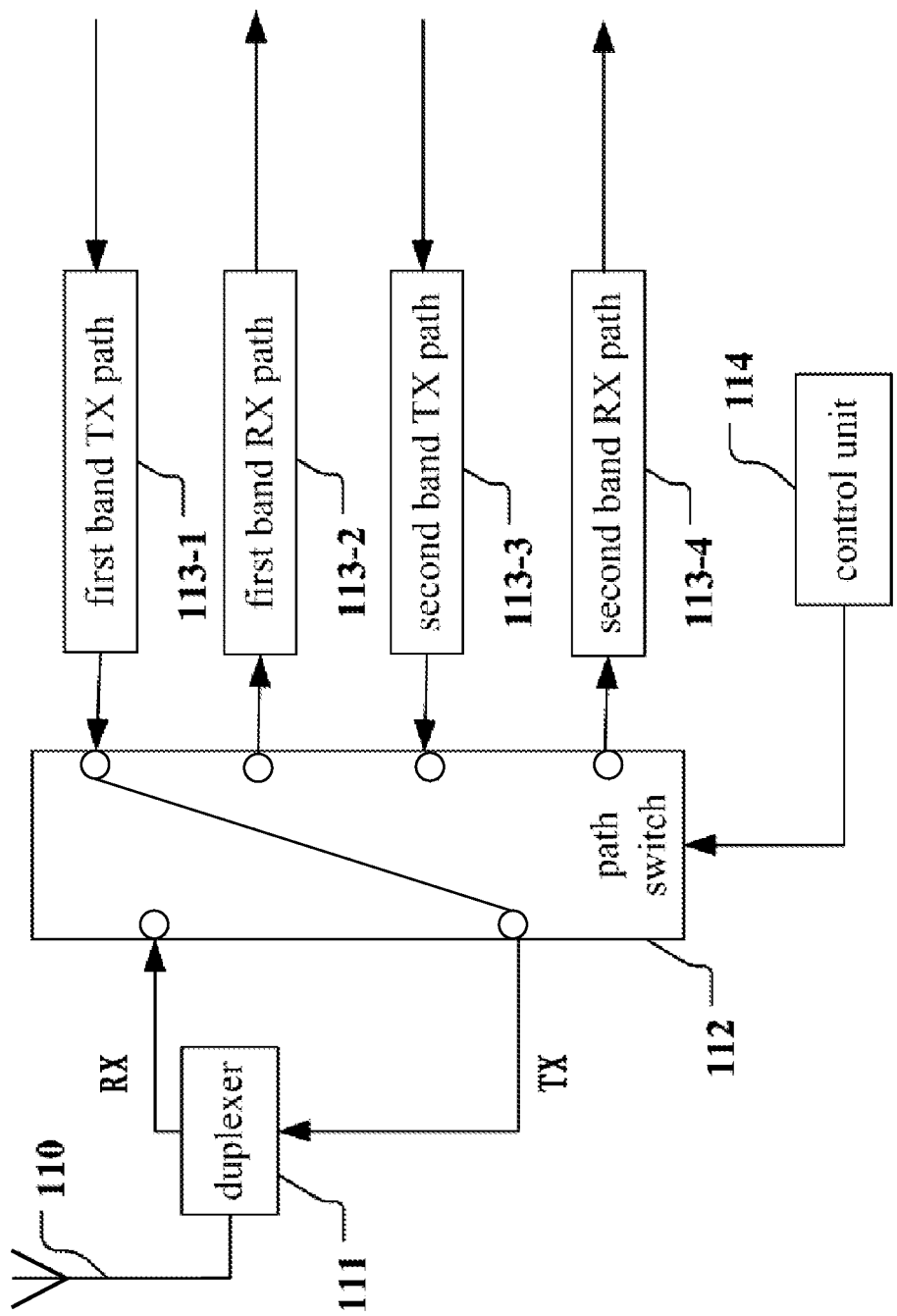
FIG. 9 is a block diagram showing another kind of connection relation when the wireless communication transceiver of FIG. 1 is operating in the single band time division duplexing mode according to an embodiment of the present invention.

FIG. 9 is a block diagram showing another kind of connection relation when the wireless communication transceiver of FIG. 1 is operating in the single band time division duplexing mode. The antenna 110, duplexer 111, first band transmission path 113-1, first band reception path 113-2, second band transmission path 113-3, second band reception path 113-4 as shown in FIG. 9 are identical to the antenna 110, duplexer 111, first band transmission path 113-1, first band reception path 113-2, second band transmission path 113-3, second band reception path 113-4 as shown in FIG. 1 respectively, and description thereof is omitted.

As shown in FIG. 9, when the wireless communication transceiver operates in the single band time division duplexing mode, the control unit 114 controls the path switch 112, so that the path switch 112 connects the transmitted radio frequency signal TX from the transmission path operating on the first band, i.e., the first band transmission path 113-1, to the duplexer 111, in the transmission cycle.

In the case when the wireless communication transceiver is operating in the single band time division duplexing mode, the control unit 114 can identify the reception cycle and the transmission cycle, and transmit a control signal corresponding to the respective cycle to the path switch 112. The path switch 112 then establishes a corresponding connection relation according to the control signal.

In the embodiments shown in FIG. 8 and FIG. 9, the first band is adopted, and thus under control by the control unit 114, the path switch 112 establishes connections from the duplexer 111 to the first band transmission path 113-1 and the first band reception path 113-2, so that the wireless communication transceiver operates in the time division duplexing mode on one band. However, it is also possible to adopt the second band, and thus connections are established from the duplexer 111 to the second band transmission path 113-3 and the second band reception path 113-4, so that the wireless communication transceiver operates in the time division duplexing mode on one band.

It is possible to indicate to the control unit 114 of the entrance of the wireless communication transceiver into the single band time division duplexing mode and the adopted band. For example, it is possible to input a signal indicating the entrance into the single band time division duplexing mode and the adopted band to the control unit 114 through a dedicated connection or a network connection, to input the signal indicating the entrance into the single band time division duplexing mode and the adopted band by providing an input device on the control unit 114, to enable the entrance into the single band time division duplexing mode and the determination of the adopted band by the control unit 114 according to predetermined configuration information, or the like.

Figure 10:
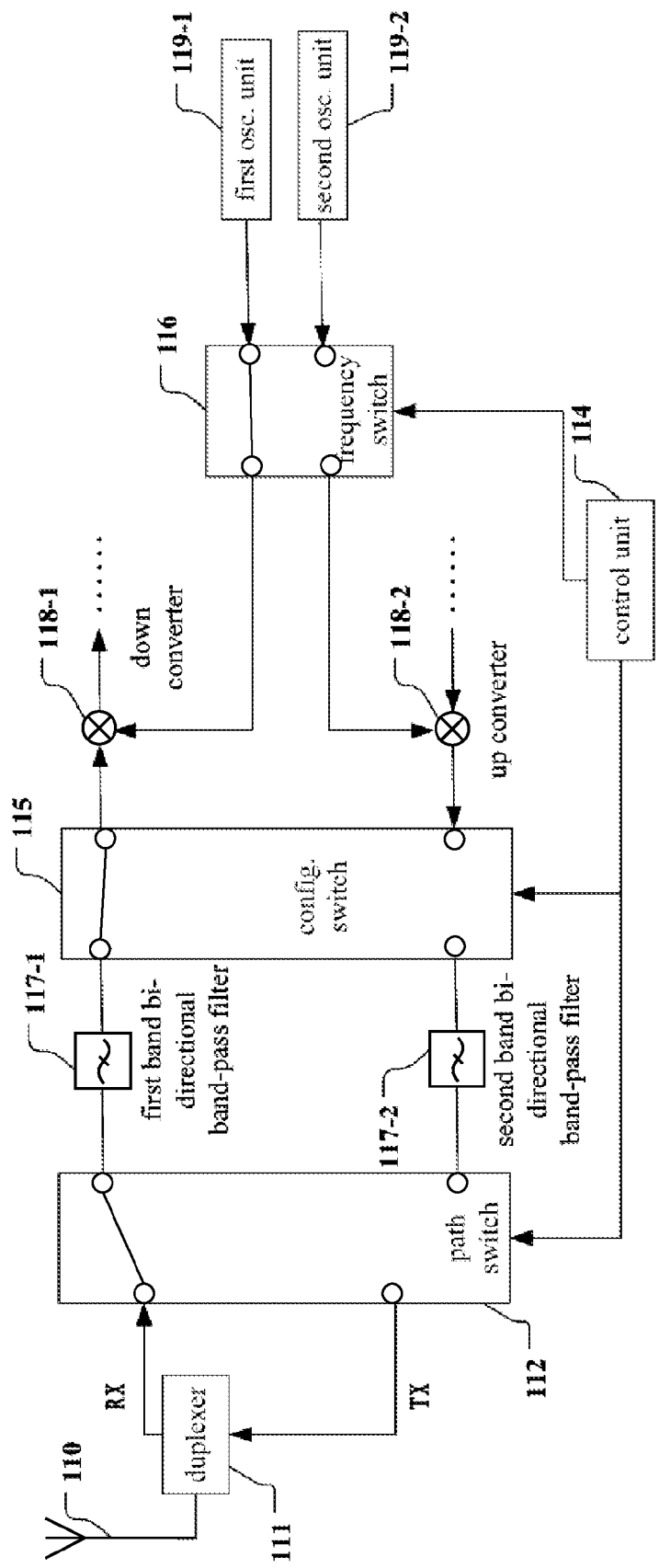
FIG. 10 is a block diagram showing a kind of connection relation when the wireless communication transceiver of FIG. 5 is operating in a single band time division duplexing mode according to an embodiment of the present invention.

FIG. 10 is a block diagram showing a kind of connection relation when the wireless communication transceiver of FIG. 5 is operating in a single band time division duplexing mode. The antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 10 are identical to the antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 5 respectively, and description thereof is omitted. The control by the control unit 114 to the path switch 112 is identical to that described in connection with FIG. 8, and description thereof is omitted.

As shown in FIG. 10, in the single band time division duplexing mode, the first band is adopted, and the control unit 114 controls the configuration switch 115 and the frequency switch 116, so that the configuration switch 115 connects the first band bi-directional band-pass filter 117-1 with the down converter 118-1 and the frequency switch 116 connects the down converter 118-1 with the first oscillating unit 119-1 in the reception cycle, thereby forming the first band reception path.

Figure 11:
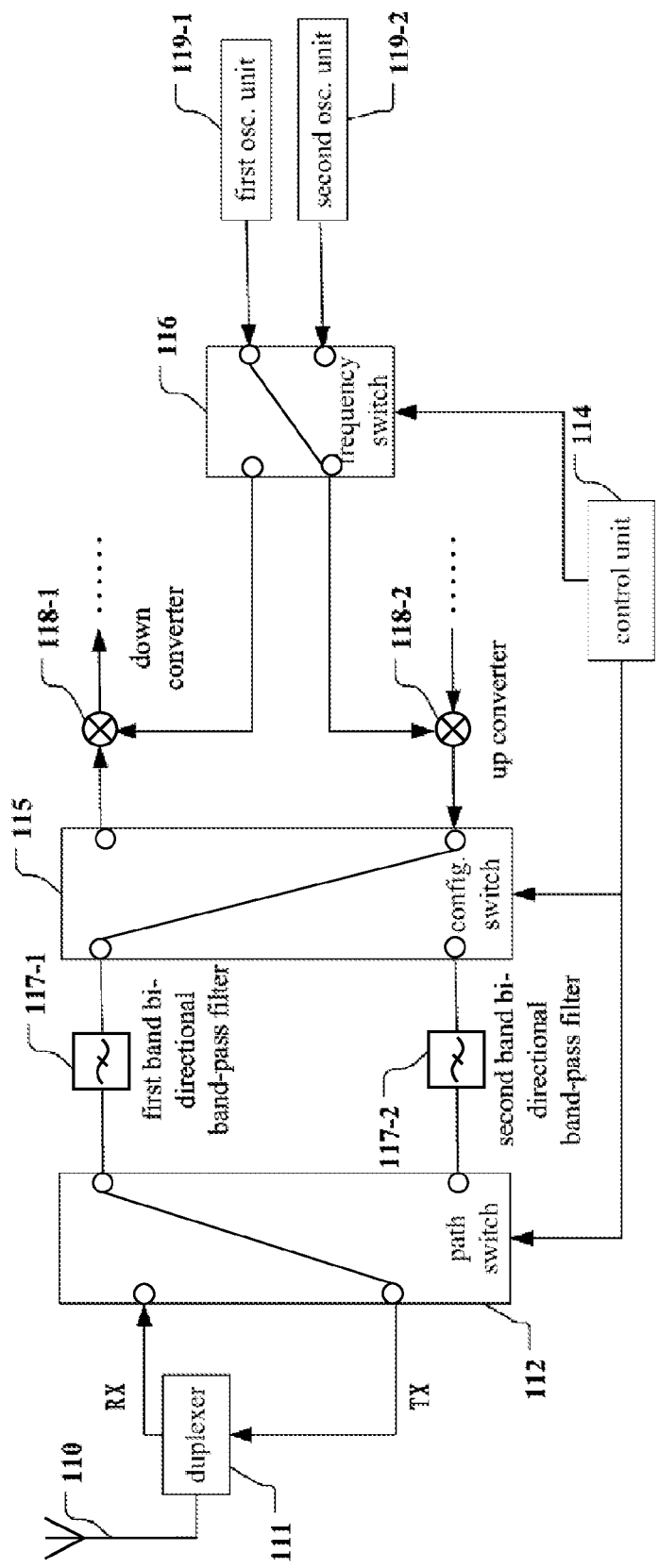
FIG. 11 is a block diagram showing another kind of connection relation when the wireless communication transceiver of FIG. 5 is operating in the single band time division duplexing mode according to an embodiment of the present invention.

FIG. 11 is a block diagram showing another kind of connection relation when the wireless communication transceiver of FIG. 5 is operating in the single band time division duplexing mode. The antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 11 are identical to the antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 5 respectively, and description thereof is omitted. The control by the control unit 114 to the path switch 112 is identical to that described in connection with FIG. 9, and description thereof is omitted.

As shown in FIG. 11, in the single band time division duplexing mode, the first band is also adopted, and the control unit 114 controls the configuration switch 115 and the frequency switch 116, so that the configuration switch 115 connects the first band bi-directional band-pass filter 117-1 with the up converter 118-2 and the frequency switch 116 connects the up converter 118-2 with the first oscillating unit 119-1 in the transmission cycle, thereby forming the first band transmission path.

In the embodiments shown in FIG. 10 and FIG. 11, the first band is adopted, and thus under control by the control unit 114, the path switch 112 establishes connections from the duplexer 111 to the first band transmission path and the first band reception path formed dynamically, so that the wireless communication transceiver operates in the time division duplexing mode on one band. However, it is also possible to adopt the second band, and thus connections are established from the duplexer 111 to the second band transmission path and the second band reception path formed dynamically, so that the wireless communication transceiver operates in the time division duplexing mode on one band. In this case, the control unit 114 controls the configuration switch 115 and the frequency switch 116, so that the configuration switch 115 connects the second band bi-directional band-pass filter 117-2 with the down converter 118-1 and the frequency switch 116 connects the down converter 118-1 with the second oscillating unit 119-2 in the reception cycle, thereby forming the second band reception path; the configuration switch 115 connects the second band bi-directional band-pass filter 117-2 with the up converter 118-2, and the frequency switch 116 connects the up converter 118-2 with the second oscillating unit 119-2 in the transmission cycle, thereby forming the second band transmission path.

In the embodiments of FIG. 10 and FIG. 11, it is possible to indicate to the control unit 114 of the entrance of the wireless communication transceiver into the single band time division duplexing mode and the adopted band through various ways. For example, it is possible to input a signal indicating the entrance into the single band time division duplexing mode and the adopted band to the control unit 114 through a dedicated connection or a network connection, to input the signal indicating the entrance into the single band time division duplexing mode and the adopted band by providing an input device on the control unit 114, to enable the entrance into the single band time division duplexing mode and the determination of the adopted band by the control unit 114 according to predetermined configuration information, or the like. Further, the wireless communication transceivers as shown in FIG. 1 and FIG. 5 can also operate in the frequency division duplexing mode.

Figure 12:
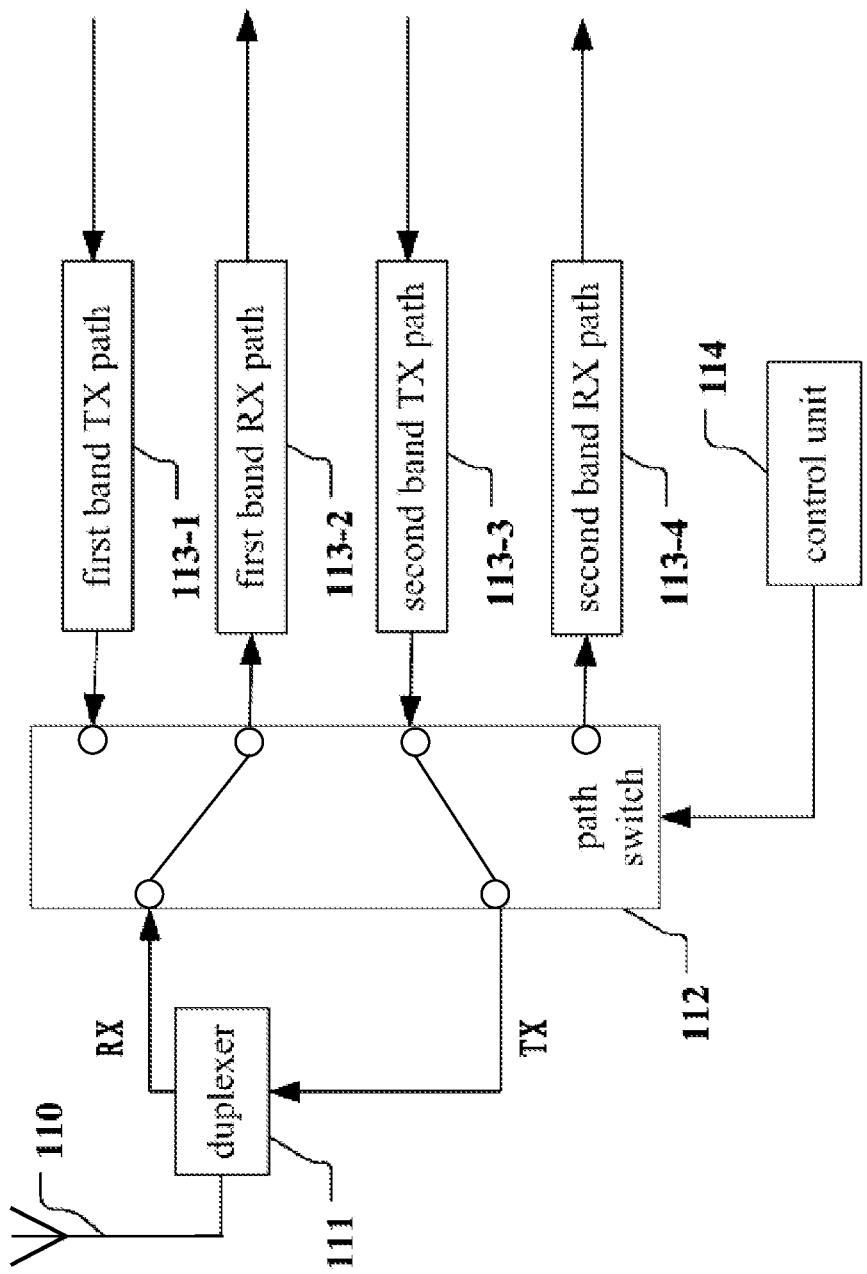
FIG. 12 is a block diagram showing a kind of connection relation when the wireless communication transceiver of FIG. 1 is operating in a frequency division duplexing mode according to an embodiment of the present invention.

FIG. 12 is a block diagram showing a kind of connection relation when the wireless communication transceiver of FIG. 1 is operating in a frequency division duplexing mode. The antenna 110, duplexer 111, first band transmission path 113-1, first band reception path 113-2, second band transmission path 113-3, second band reception path 113-4 as shown in FIG. 12 are identical to the antenna 110, duplexer 111, first band transmission path 113-1, first band reception path 113-2, second band transmission path 113-3, second band reception path 113-4 as shown in FIG. 1 respectively, and description thereof is omitted.

As shown in FIG. 12, in the frequency division duplexing mode, the first band is used for reception, and the second band is used for transmission. The control unit 114 controls the path switch 112, so that the path switch 112 connects the received radio frequency signal RX from the duplexer 111 to the first band reception path 113-2, and connects the transmitted radio frequency signal TX from the second band transmission path 113-3 to the duplexer 111.

In the case when the wireless communication transceiver is operating in the frequency division duplexing mode, the control unit 114 can determine the band allocation, and transmit a control signal corresponding to the band allocation to the path switch 112. The path switch 112 then establishes a connection relation corresponding to the band allocation according to the control signal.

Alternatively, in the frequency division duplexing mode, the first band can be used for transmission, and the second band can be used for reception. In this case, the control unit 114 controls the path switch 112, so that the path switch 112 connects the received radio frequency signal RX from the duplexer 111 to the second band reception path 113-4, and connects the transmitted radio frequency signal TX from the first band transmission path 113-1 to the duplexer 111.

It is possible to indicate to the control unit 114 of the entrance of the wireless communication transceiver into the frequency division duplexing mode and the band allocation. For example, it is possible to input a signal indicating the entrance into the frequency division duplexing mode and the band allocation to the control unit 114 through a dedicated connection or a network connection, to input the signal indicating the entrance into the frequency division duplexing mode and the band allocation by providing an input device on the control unit 114, to enable the entrance into the frequency division duplexing mode and the determination of the band allocation by the control unit 114 according to predetermined configuration information, or the like.

Figure 13:
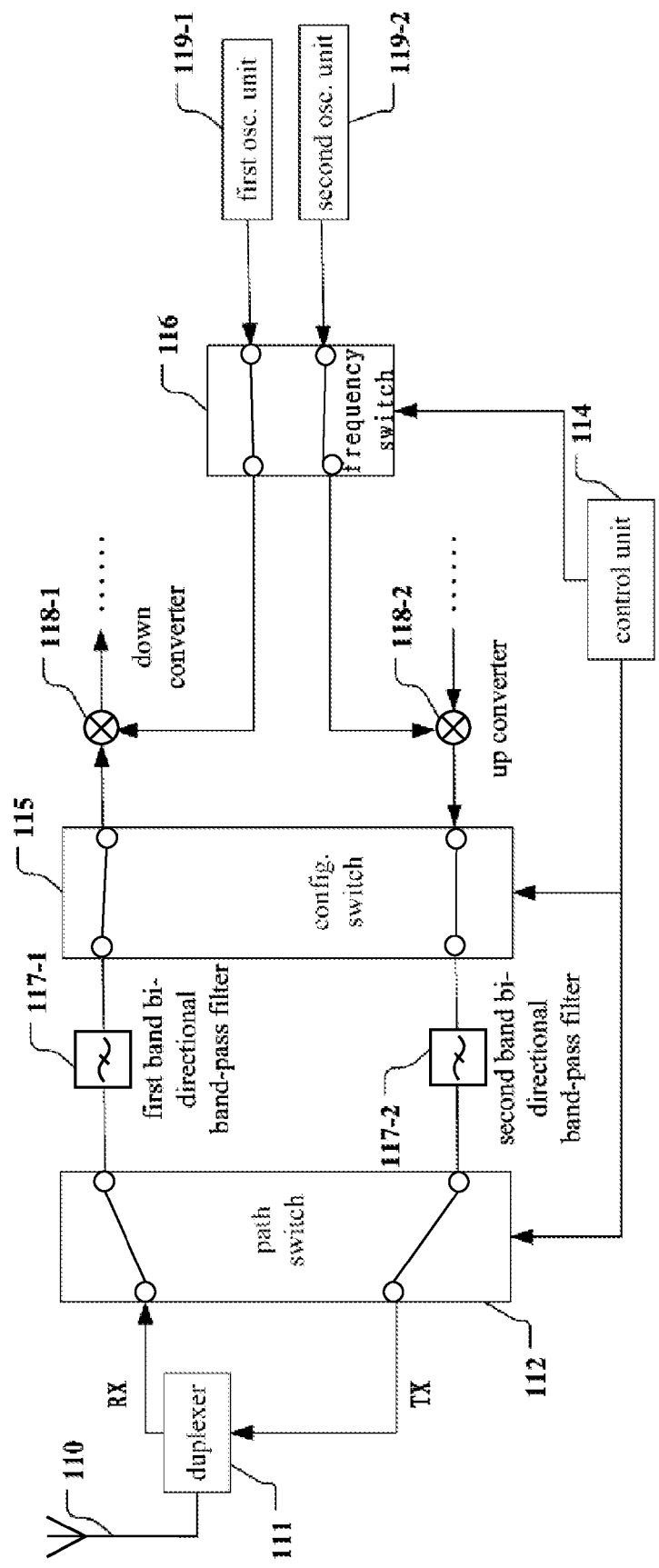
FIG. 13 is a block diagram showing a kind of connection relation when the wireless communication transceiver of FIG. 5 is operating in the frequency division duplexing mode according to an embodiment of the present invention.

FIG. 13 is a block diagram showing a kind of connection relation when the wireless communication transceiver of FIG. 5 is operating in the frequency division duplexing mode. The antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 13 are identical to the antenna 110, duplexer 111, first band bi-directional band-pass filter 117-1, second band bi-directional band-pass filter 117-2, down converter 118-1, up converter 118-2, first oscillating unit 119-1 and second oscillating unit 119-2 as shown in FIG. 5 respectively, and description thereof is omitted. The control by the control unit 114 to the path switch 112 is identical to that described in connection with FIG. 12, and description thereof is omitted.

As shown in FIG. 12, in the frequency division duplexing mode, the first band is used for reception, and the second band is used for transmission. The control unit 114 controls the configuration switch 115 and the frequency switch 116, so that the configuration switch 115 connects the first band bi-directional band-pass filter 117-1 with the down converter 118-1 and the frequency switch 116 connects the down converter 118-1 with the first oscillating unit 119-1, thereby forming the first band reception path; the configuration switch 115 connects the second band bi-directional band-pass filter 117-2 with the up converter 118-2, and the frequency switch 116 connects the up converter 118-2 with the second oscillating unit 119-2, thereby forming the second band transmission path.

In the case when the wireless communication transceiver is operating in the frequency division duplexing mode, the control unit 114 can determine the band allocation, and transmit a control signal corresponding to the band allocation to the configuration switch 115 and the frequency switch 116. The configuration switch 115 and the frequency switch 116 then establish a connection relation corresponding to the band allocation according to the control signal.

Alternatively, in the frequency division duplexing mode, the first band can be used for transmission, and the second band can be used for reception. In this case, the control unit 114 controls the configuration switch 115 and the frequency switch 116, so that the configuration switch 115 connects the second band bi-directional band-pass filter 117-2 with the down converter 118-1 and the frequency switch 116 connects the down converter 118-1 with the second oscillating unit 119-2, thereby forming the second band reception path; the configuration switch 115 connects the first band bi-directional band-pass filter 117-1 with the up converter 118-2, and the frequency switch 116 connects the up converter 118-2 with the first oscillating unit 119-1, thereby forming the first band transmission path.

It is possible to indicate to the control unit 114 of the entrance of the wireless communication transceiver into the frequency division duplexing mode and the band allocation. For example, it is possible to input a signal indicating the entrance into the frequency division duplexing mode and the band allocation to the control unit 114 through a dedicated connection or a network connection, to input the signal indicating the entrance into the frequency division duplexing mode and the band allocation by providing an input device on the control unit 114, to enable the entrance into the frequency division duplexing mode and the determination of the band allocation by the control unit 114 according to predetermined configuration information, or the like.

The present invention is described in the above by referring to specific embodiments. One skilled in the art should understand that various modifications and changes can be made without departing from the scope as set forth in the following claims.

What is claimed is:

1. A wireless communication transceiver comprising:
   a first band transmission path for modulating data to be sent into a radio frequency signal of said first band;
   a first band reception path for demodulating a received radio frequency signal of said first band into received data;
   a second band transmission path for modulating data to be sent into a radio frequency signal of a second band different from said first band;
   a second band reception path for demodulating a received radio frequency signal of said second band into received data;
   a path switch; and
   a control unit,
   wherein in a dual band time division duplexing mode, said control unit controls said path switch in a dual band time division duplexing mode (i) so that said path switch forms a first band reception path that connects a received radio frequency signal from an antenna to a first oscillating unit, and at the same time forms a second band transmission path that connects a transmitted radio frequency signal from a second oscillating unit to said antenna in an odd cycle or in an even cycle; and (ii) so that said path switch forms a second band reception path that connects a received radio frequency signal from said antenna to said second oscillating unit, and at the same time forms a first band transmission path that connects a transmitted radio frequency signal from said first oscillating unit to said antenna in another odd cycle or another even cycle.

2. The wireless communication transceiver according to claim 1, further comprising:
   a first band bi-directional band-pass filter for passing through said radio frequency signals of said first band;
   a second band bi-directional band-pass filter for passing through said radio frequency signals of said second band;
   a configuration switch;
   a down converter for converting a radio frequency signal into an intermediate frequency signal;
   an up converter for converting an intermediate frequency signal into a radio frequency signal;
   a frequency switch;
   a first oscillating unit for generating an oscillating signal of a first frequency; and
   a second oscillating unit for generating an oscillating signal of a second frequency,
   wherein said control unit is configured (i) to control said configuration switch and said frequency switch in a dual band time division duplexing mode, so that in said odd cycle or in said even cycle, said configuration switch connects said first band bi-directional band-pass filter with said down converter, and said frequency switch connects said down converter with said first oscillating unit, thereby forming said first band reception path, while said configuration switch connects said second band bi-directional band-pass filter with said up converter, and said frequency switch connects said up converter with said second oscillating unit, thereby forming said second band transmission path; and (ii) to control said configuration switch and said frequency switch, so that in said another odd cycle or said another even cycle, said configuration switch connects said second band bi-directional band-pass filter with said down converter, and said frequency switch connects said down converter with said second oscillating unit, thereby forming said second band reception path, while said configuration switch connects said first band bi-directional band-pass filter with said up converter, and said frequency switch connects said up converter with said first oscillating unit, thereby forming said first band transmission path.

3. The wireless communication transceiver according to claim 1, wherein said control unit is further configured to control said path switch in a single band time division duplexing mode, so that said path switch connects said received radio frequency signal from said antenna to said reception path operating on said first band or said second band in a reception cycle, and connects said transmitted radio frequency signal from said transmission path operating on said first band or said second band to said antenna in a transmission cycle.

4. The wireless communication transceiver according to claim 3, further comprising:
   a first band bi-directional band-pass filter for passing through said radio frequency signals of said first band;
   a second band bi-directional band-pass filter for passing through said radio frequency signals of said second band;
   a configuration switch;
   a down converter for converting a radio frequency signal into an intermediate frequency signal;
   an up converter for converting an intermediate frequency signal into a radio frequency signal;
   a frequency switch;
   a first oscillating unit for generating an oscillating signal of a first frequency; and
   a second oscillating unit for generating an oscillating signal of a second frequency,
   wherein in said single band time division duplexing mode, if operation occurs in said first band, said control unit is configured to control said configuration switch and said frequency switch, (i) so that in said reception cycle, said configuration switch connects said first band bi-directional band-pass filter with said down converter, and said frequency switch connects said down converter with said first oscillating unit, thereby forming said first band reception path, and (ii) so that in said transmission cycle, said configuration switch connects said first band bi-directional band-pass filter with said up converter, and said frequency switch connects said up converter with said first oscillating unit, thereby forming said first band transmission path, and if operation occurs in said second band, said control unit is configured to control said configuration switch and said frequency switch, (i) so that in said reception cycle, said configuration switch connects said second band bi-directional band-pass filter with said down converter, and said frequency switch connects said down converter with said second oscillating unit, thereby forming said second band reception path, and (ii) so that in said transmission cycle, said configuration switch connects said second band bi-directional band-pass filter with said up converter, and said frequency switch connects said up converter with said second oscillating unit, thereby forming said second band transmission path.

5. The wireless communication transceiver according to claim 1, wherein said control unit is further configured to control said path switch in a frequency division duplexing mode, so that said path switch connects a received radio frequency signal from said antenna to said reception path operating on said first band or said second band, and connects a transmitted radio frequency signal from said transmission path operating on said another first band or said another second band to said antenna.

6. The wireless communication transceiver according to claim 5, further comprising:
   a first band bi-directional band-pass filter for passing through said radio frequency signals of said first band;
   a second band bi-directional band-pass filter for passing through said radio frequency signals of said second band;
   a configuration switch;
   a down converter for converting a radio frequency signal into an intermediate frequency signal;
   an up converter for converting an intermediate frequency signal into a radio frequency signal;
   a frequency switch;
   a first oscillating unit for generating an oscillating signal of a first frequency; and
   a second oscillating unit for generating an oscillating signal of a second frequency,
   wherein in said frequency division duplexing mode,
   if operation occurs in said first band, said control unit is configured to control said configuration switch and said frequency switch, (i) so that said configuration switch connects said first band bi-directional band-pass filter with said down converter, and said frequency switch connects said down converter with said first oscillating unit, thereby forming said first band reception path, and (ii) so that said configuration switch connects said second band bi-directional band-pass filter with said up converter, and said frequency switch connects said up converter with said second oscillating unit, thereby forming said second band transmission path, and
   if operation occurs in said second band, said control unit is configured to control said configuration switch and said frequency switch, (i) so that said configuration switch connects said second band bi-directional band-pass filter with said down converter, and said frequency switch connects said down converter with said second oscillating unit, thereby forming said second band reception path, and (ii) so that said configuration switch connects said first band bi-directional band-pass filter with said up converter, and said frequency switch connects said up converter with said first oscillating unit, thereby forming said first band transmission path.

7. The wireless communication transceiver according to claim 1, further comprising:
   a duplexer for isolating said radio frequency signals transmitted and received via said antenna,
   wherein said path switch is connected to said antenna through said duplexer.

8. A mode switch device for a wireless communication transceiver, comprising:
   a path switch which, in response to a control signal indicating that said wireless communication transceiver is operating in a dual band time division duplexing mode and indicative of an odd cycle or an even cycle, forms a first band reception path for demodulating said received radio frequency signal of a first band into received data that connects the received radio frequency signal from an antenna to a first oscillating unit, and at the same time forms a second band transmission path for modulating data to be sent into said radio frequency signal of a second band different from said first band that connects a transmitted radio frequency signal from a second oscillator unit to said antenna, and
   in response to a control signal indicating that said wireless communication transceiver is operating in said dual band time division duplexing mode and indicative of another odd cycle or another even cycle, forms connects a received radio frequency signal from said antenna to a second band reception path for demodulating said received radio frequency signal of said second band into received data, wherein said second band reception path connects the received radio frequency signal from the antenna to the second oscillator unit and at the same time forms connects a transmitted radio frequency signal from a first band transmission path for modulating data to be sent into said radio frequency signal of said first band, wherein said first band transmission path connects the received radio frequency signal from the first oscillator unit to said antenna.

9. The mode switch device for a wireless communication transceiver according to claim 8, further comprising:
   a configuration switch; and
   a frequency switch,
   wherein in response to said control signal indicating that said wireless communication transceiver is operating in said dual band time division duplexing mode and indicative of said odd cycle or said even cycle, said configuration switch connects a first band bi-directional band-pass filter for passing through said radio frequency signals of said first band with a down converter for converting a radio frequency signal into an intermediate frequency signal, and said frequency switch connects said down converter with a first oscillating unit for generating an oscillating signal of a first frequency, thereby forming said first band reception path, while said configuration switch connects a second band bi-directional band-pass filter for passing through said radio frequency signals of said second band with an up converter for converting an intermediate frequency signal into a radio frequency signal, and said frequency switch connects the up converter with a second oscillating unit for generating an oscillating signal of a second frequency, thereby forming said second band transmission path, and
   in response to said control signal indicating that said wireless communication transceiver is operating in said dual band time division duplexing mode and indicative of said another odd cycle or said another even cycle, said configuration switch connects said second band bi-directional band-pass filter with said down converter, and said frequency switch connects said down converter with said second oscillating unit, thereby forming said second band reception path, while said configuration switch connects said first band bi-directional band-pass filter with said up converter, and said frequency switch connects said up converter with said first oscillating unit, thereby forming said first band transmission path.

10. The mode switch device for a wireless communication transceiver according to claim 8, wherein said path switch is configured to, in response to said control signal indicating that said wireless communication transceiver is operating in a single band time division duplexing mode and indicative of a reception cycle, connects said received radio frequency signal from said antenna to said reception path operating on said first band or said second band, and in response to said control signal indicating that said wireless communication transceiver is operating in said single band time division duplexing mode and indicative of a transmission cycle, connects said transmitted radio frequency signal from said transmission path operating on said first band or said second band to said antenna.

11. The mode switch device for a wireless communication transceiver according to claim 10, further comprising:
a configuration switch; and
a frequency switch,
wherein if operation occurs in said first band,
(i) in response to said control signal indicating that said wireless communication transceiver is operating in said single band time division duplexing mode and indicative of said reception cycle, said configuration switch connects a first band bi-directional band-pass filter for passing through said radio frequency signals of said first band with a down converter for converting a radio frequency signal into an intermediate frequency signal, and said frequency switch connects said down converter with a first oscillating unit for generating an oscillating signal of a first frequency, thereby forming said first band reception path, and
(ii) in response to said control signal indicating that said wireless communication transceiver is operating in said single band time division duplexing mode and indicative of said transmission cycle, said configuration switch connects said first band bi-directional band-pass filter with an up converter for converting an intermediate frequency signal into a radio frequency signal, and said frequency switch connects said up converter with said first oscillating unit, thereby forming said first band transmission path, and
wherein if operation occurs in said second band,
(i) in response to said control signal indicating that said wireless communication transceiver is operating in said single band time division duplexing mode and indicative of said reception cycle, said configuration switch connects a second band bi-directional band-pass filter for passing through said radio frequency signals of said second band with said down converter, and said frequency switch connects said down converter with a second oscillating unit for generating an oscillating signal of a second frequency, thereby forming said second band reception path, and
(ii) in response to said control signal indicating that said wireless communication transceiver is operating in said single band time division duplexing mode and indicative of said transmission cycle, said configuration switch connects said second band bi-directional band-pass filter with said up converter, and said frequency switch connects said up converter with said second oscillating unit, thereby forming said second band transmission path.

12. The mode switch device for a wireless communication transceiver according to claim 8, wherein said path switch is configured to, in response to said control signal indicating that said wireless communication transceiver is operating in a frequency division duplexing mode, connects said received radio frequency signal from said antenna to said reception path operating on said first band or said second band, and connects a transmitted radio frequency signal from said transmission path operating on said another first band or said another second band to said antenna.

13. The mode switch device for a wireless communication transceiver according to claim 12, further comprising:
a configuration switch; and
a frequency switch,
wherein in response to said control signal indicating that said wireless communication transceiver is operating in said frequency division duplexing mode,
if operation occurs in said first band, said configuration switch connects a first band bi-directional band-pass filter for passing through said radio frequency signals of said first band with a down converter for converting a radio frequency signal into an intermediate frequency signal, and said frequency switch connects said down converter with a first oscillating unit for generating an oscillating signal of a first frequency, thereby forming said first band reception path, while said configuration switch connects a second band bi-directional band-pass filter for passing through said radio frequency signals of said second band with an up converter for converting an intermediate frequency signal into a radio frequency signal, and said frequency switch connects the up converter with a second oscillating unit for generating an oscillating signal of a second frequency, thereby forming said second band transmission path, and
if operation occurs in said second band, said configuration switch connects said second band bi-directional band-pass filter with said down converter, and said frequency switch connects said down converter with said second oscillating unit, thereby forming said second band reception path, while said configuration switch connects said first band bi-directional band-pass filter with said up converter, and said frequency switch connects said up converter with said first oscillating unit, thereby forming said first band transmission path.

* * * * *